Sept. 23, 1947.    E. M. WASHBURN    2,427,825
ART OF MOUNTING PIEZOELECTRIC CRYSTALS
Filed Nov. 6, 1943
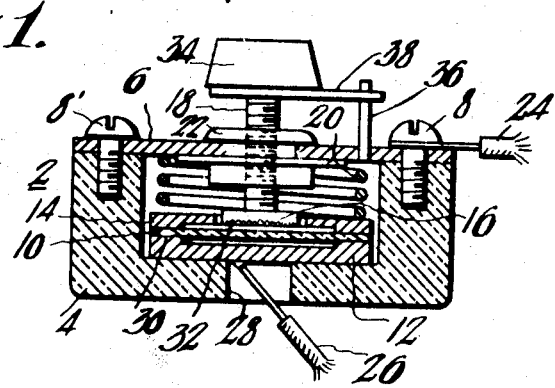
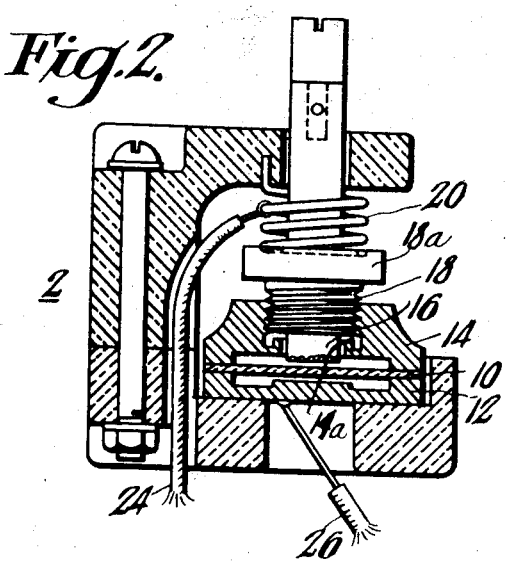
Inventor
Edward M. Washburn
By C. D. Tuska
Attorney Patented Sept. 23, 1947

2,427,825

UNITED STATES PATENT OFFICE 2,427,825

ART OF MOUNTING PIEZOELECTRIC CRYSTALS

Edward M. Washburn, Merchantville, N. J., assignor to Radio Corporation of America, a corporation of Delaware Application November 6, 1943, Serial No. 509,195

1 Claim. (Cl. 171—327)

This invention relates to the art of mounting piezo-electric elements and has special reference to the provision of improvements in variable air-gap holders for quartz and similar crystals.

It is well known to those skilled in the art to which this invention appertains that the frequency at which a quartz or similar crystal element is adapted to respond may be varied over an appreciable range simply by varying the spacing between the crystal and one of its electrodes. This phenomenon has been utilized not only to achieve an exact "adjustably fixed" frequency (see U. S. Patents 1,617,995 and 1,790,355) but also to achieve a "continuously variable" frequency response, e. g., for frequency modulation purposes (see U. S. Patent 2,289,183).

The principal objection to present day variable air-gap crystal holders is that the changes in frequency which they effect are accompanied by usually undesired changes in the amplitude of the produced oscillations. That is to say, in the variable air-gap holders of the prior art, when the movable electrode is moved away from the crystal (to increase its normal frequency of oscillation) the vibrations of the crystal at the new frequency are by no means as vigorous as they were prior to the adjustment (provided, of course, that the potential applied to the electrodes remains the same).

Accordingly, the principal object of the present invention is to provide an improved variable air-gap crystal holder, and one wherein the oscillating frequency of the crystal may be changed at least over a limited range without any substantial change in the amplitude of its oscillations.

Another and important object of the invention is to achieve the foregoing principal object in a crystal holder suitable for use in mobile and other installations wherein the crystal may be subjected to forces tending to displace the crystal in its holder.

The above mentioned and other objects and advantages are achieved, in accordance with the invention, by the provision of a variable air-gap crystal holder comprising a pair of fixed electrodes, between which the crystal is clamped (to prevent displacement), and a third electrode electrically connected to one of the other electrodes and mounted to permit of relative movement with respect to the electrode face of the crystal to which it is presented. The electrode surface of the movable electrode is preferably considerably smaller than that of either of the fixed electrodes and operates to vary the frequency of the crystal by changing the dimensions of the air-gap between it and the crystal. The preferably larger fixed electrodes, on the other hand, operate to maintain the amplitude of the oscillations constant, or nearly so, substantially irrespective of the position of the movable electrode with respect to the crystal. The movable electrode is preferably presented to the same electrode face of the crystal as is the electrode to which it is electrically connected and may, in fact, comprise a circular section cut out from the center of the said fixed electrode or "plate." (It is thus proper to refer to these adjacent electrically connected plates as a "bi-part electrode".)

The ratio of the area of the movable to the immovable (or normally stationary) part of the bi-part electrode will ordinarily be chosen with a careful regard to the particular frequency vs. amplitude characteristic desired. When this ratio is of the order of 1:3 or less the frequency change is small but the activity of the crystal remains substantially constant. When the ratio approaches unity the possible frequency change is proportionately greater, but the activity of the crystal (as measured by rectified grid current) may vary appreciably. It has been found that to provide a frequency variation of ±.025 per cent with less than ±10 per cent variation in activity (as measured by rectified grid current) the ratio of the area of the movable part to the fixed part should be substantially of the order of 1:3.

Certain preferred details of construction together with other objects and advantages will be apparent and the invention itself will be best understood by reference to the following specification and to the accompanying drawing, wherein:

Figure 1 is a cross-sectional view of a variable air-gap crystal assembly constructed in accordance with the principle of the invention, and Figure 2 is a similar view of an alternative embodiment of the invention.

In Figure 1, 2 designates, generally, a housing comprising a hollow cup-shape base 4 constituted of insulating material and provided with a metal cover plate 6 which is affixed to the rim of the said base by screws 8, 8'. A quartz or other piezo-electric crystal element is designated 10 and is shown mounted, in accordance with the invention, between two stationary electrodes 12 and 14, respectively, and a third, centrally located electrode 16 which is supported on a screw 18 to permit of its being moved vertically with respect to the "upper" electrode face of the crystal. As previously set forth, such movement operates to vary the frequency of the crystal by changing the dimensions of the air-gap between the crystal and the said electrode 16. The clamping force which maintains the crystal 10 against displacement is provided by a coil spring 20 which bears against the stationary "top" electrode 14 by reason of the compression force applied to the said spring by the metal cover plate 6.

Since the spring 20 is conductive, the stationary electrode 14 against which it bears is electrically connected to the metal cover 6. The movable electrode 16 is connected to the metal cover 6 through the screw 18 and the metal bushing 22 through which the said screw extends. Thus one of the metal screws 8 which serves to hold the cover 6 in place may be used as a binding post for connecting the "top" electrodes 14 and 16 to an external lead 24. The other necessary external lead 26 is shown connected to the bottom electrode 12 through an aperture 28 in the base 4 of the holder tube.

The clamping electrodes 12 and 14 may be of more or less standard design; that is to say, they may be either circular or rectangular in outline (as determined by the shape of the crystal) and may be provided each with a circumferentially raised rim or corners 30 so that the clamping force is applied to the crystal adjacent to its perimeter or to its corner areas only. When the crystal is cut to respond to a relatively high frequency the surfaces of the electrodes 12, 14 and 16 (or any of them) may be provided with annular grooves as indicated at 32 in order to counteract so called "critical air-gap effects."

The dimensions of the air-gap may be adjusted either manually to achieve an adjustably fixed frequency or continuously, for frequency modulation purposes. In the latter case, an electromagnetic drive similar to the one shown by Ehret et al. (U. S. Patent 2,289,183) may be employed and, in the former case, as shown in Figure 1, the screw 18 upon which the adjustable electrode 16 is mounted, may be provided with a knob 34 and with a stop 36 and a pointer 38 which, when read in connection with a suitable scale (not shown) on the cover 6, indicates the frequency to which the crystal is tuned.

In the embodiment of the invention shown in Fig. 2 as in Fig. 1, the centrally located adjustable electrode 16 is mounted on the leading end of an adjusting screw 18. Unlike the similarly numbered screw of Fig. 1, however, the screw 18 of Fig. 2 is supported for rotation within the upper stationary electrode 14 and the clamping force supplied by the coil spring 20 is applied indirectly, instead of directly, to the said stationary upper electrode through a flange 18a on the said screw. It will also be observed that the threaded hole in the upper stationary electrode 14 in which the screw 18 and the movable electrode 16 are received is provided with an annular groove 14a in its base. The rim of this groove serves as a stop for the movable electrode and the groove per se comprises a "dust trap" in which grease or other foreign matter which might tend to settle upon the crystal is caught. The particular holder here illustrated will ordinarily be contained in a dust proof outer casing (not shown), in which case the lead 24 (which is connected through the spring 20 and screw 18 to both of the "upper electrodes" 14 and 16) and the lead 26 (which is connected to the bottom electrode only) may terminate in prongs (not shown).

Various other modifications and embodiments of the invention will suggest themselves to those skilled in the art. Accordingly, the foregoing specification should be interpreted as illustrative and not in a limiting sense except as required by the prior art and by the spirit of the appended claim.

What is claimed is:

A variable air-gap crystal holder comprising a pair of electrodes between which a crystal element is adapted to be interposed, a third electrode mounted in spaced parallel relation with respect to the plane of an electrode face of said crystal and conductively connected to one electrode of said pair, and means for varying the spacing between said third electrode and said plane of said crystal face while maintaining said parallel relation.

EDWARD M. WASHBURN.

REFERENCES CITED

The following references are of record in the file of this patent:

UNITED STATES PATENTS

| Number | Name | Date |
| --- | --- | --- |
| 1,766,036 | Crossley | June 24, 1930 |
| 1,783,131 | Ohl | Nov. 25, 1930 |
| 1,790,355 | Peterson | Jan. 27, 1931 |
| 1,962,211 | Osnos et al. | June 12, 1934 |
| 2,229,172 | Hawk | Jan. 21, 1941 |
| 2,319,357 | Thurston | May 18, 1943 |